G. L. LEWIS.
MEANS FOR FORCING WIRES INTO THE GROOVES OF WHEELS.
APPLICATION FILED JAN. 15, 1909.
969,067.
Patented Aug. 30, 1910.
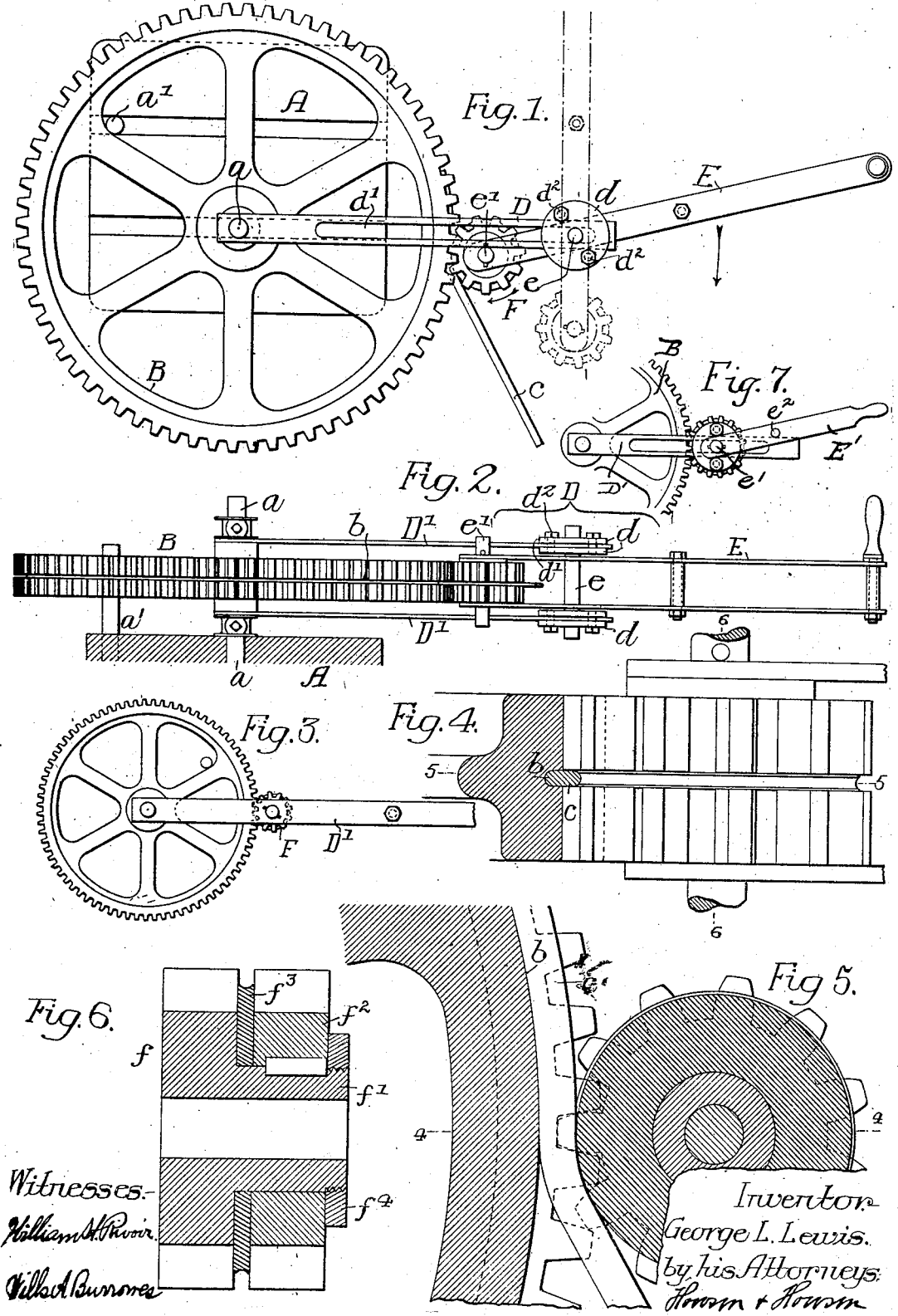

UNITED STATES PATENT OFFICE.

GEORGE L. LEWIS, OF PHILADELPHIA, PENNSYLVANIA, ASSIGNOR TO LINK-BELT COMPANY, OF CHICAGO, ILLINOIS, A CORPORATION OF ILLINOIS.

MEANS FOR FORCING WIRES INTO THE GROOVES OF WHEELS.

969,067.  Specification of Letters Patent.  Patented Aug. 30, 1910.

Application filed January 15, 1909. Serial No. 472,494.

*To all whom it may concern:*

Be it known that I, GEORGE L. LEWIS, a citizen of the United States, residing in Philadelphia, Pennsylvania, have invented certain Improvements in Means for Forcing Wires Into the Grooves of Wheels, of which the following is a specification.

The object of my invention is to provide means for accurately placing a guide strip in the groove of a wheel.

My invention is particularly adapted for placing the guide strip in a sprocket wheel used in connection with a driving chain, such a wheel being fully illustrated and claimed in the patent granted to Frank J. Oakes, No. 905,744, dated December 1, 1908.

Referring to the accompanying drawings:—Figure 1 is a plan view illustrating my improved apparatus in position on a wheel; Fig. 2 is a side view of Fig. 1; Fig. 3 is the simplest form of the device; Fig. 4 is an enlarged section on the line 4—4, Fig. 5, with the pressing wheel in full lines; Fig. 5 is a section on the line 5—5, Fig. 4; Fig. 6 is a sectional view of the pressing wheel on the line 6—6, Fig. 4; and Fig. 7 is a view of another form of the device.

A is the bed-plate of any ordinary form, to which is secured a spindle $a$, forming a bearing for the sprocket wheel B in the present instance; the wheel being held from turning by a pin $a'$ projecting from the bed-plate.

D is my improved apparatus for inserting the strip $c$ in the groove $b$ in the periphery of the wheel. This apparatus consists of two slotted arms D' pivoted to the pin $a$, one arm being on one side of the sprocket wheel and the other on the opposite side, as clearly shown in Fig. 2, and clamped to these arms D' are bearings $d$.

The pivot pin $e$ for the lever E passes through the bearings $d$ and through the slots $d'$ in the arms D'. Each bearing $d$ in the present instance consists of two plates clamped to an arm D' by bolts $d^2$, so that the bearings can be adjusted longitudinally on the arms; the slots $d'$ being of sufficient length to allow for the adjustment.

Mounted on the short arm of the lever E is a toothed presser wheel F and preferably mounted on the other arm of the lever is a handle by which the tool is operated. The teeth of the presser wheel F mesh with the teeth of the sprocket wheel B, as shown in Fig. 1, and the presser wheel is preferably made as illustrated in detail in Figs. 5 and 6.

The part $f$ of the presser wheel has a hub $f'$ upon which is mounted the part $f^2$, and between these two parts is clamped a hard metal ring $f^3$ by means of a nut $f^4$, or other device; the part $f^2$ of the wheel being held from turning on the part $f$ by a key. The periphery of the ring $f^3$ is preferably grooved, as shown, so as to accommodate the rounded edge of the strip to be inserted in the wheel.

To operate the device, one end of the strip $c$ is pressed into the groove a certain distance, then the presser wheel F is located as indicated in Fig. 1, and by moving the lever E in the direction of the arrow it will cause the presser roller F to force the strip $c$ into the groove $b$, as shown in Fig. 4; the arm being prevented from turning completely on its pivot by the pivot pin $e'$ of the presser wheel coming in contact with the arms D', so that when this pivot pin strikes the arms, the arms will move with the lever around the sprocket wheel, and as it moves the presser wheel will force the strip into the groove, as clearly illustrated in Fig. 5.

It will be understood that the strip fits the groove tightly, so that considerable pressure can be exerted to force the strip into the groove and when once the strip is in the groove it will remain in position without fastenings.

When there are a number of wheels of the same diameter to have the strip applied, then the presser wheel F can be fixed directly to the arms D', as illustrated in Fig. 3. In this instance the lever is dispensed with.

In Fig. 7, I have shown the pivot pin $e'$ of the presser wheel mounted in the slots of the arms D' and a lever E' pivoted to the pivot pin $e'$ and provided with a stop pin $e^2$.

Thus it will be seen that by the use of the above described device I can roll a strip into the groove to form the guiding rib or flange of the wheel, and the pressure can be exerted to such a degree that the strip can be driven into the slot in such a manner that it will remain in position after it is once driven.

When the finished wheel is to be removed then one of the side-bars is detached and the lever operated to back off the roller F until it is clear of the wheel, when the wheel can be withdrawn and another wheel placed in position, the arm secured, and the lever operated to shift the roller into operative position.

By using the lever the arms can be comparatively short and the lever will always be of the same length.

I claim:—

1. The combination in a device for pressing a strip into a groove of a toothed wheel, of means for holding the wheel in a fixed position, an arm adapted to be pivoted at the center of the wheel, and a toothed presser wheel carried by the arm and having an annular groove in its toothed periphery for the reception of the strip; the teeth of the presser wheel being adapted to mesh with the teeth of the wheel in which the strip is to be embedded.

2. The combination in a device for pressing a strip into the annular groove of a toothed wheel, of means for holding the wheel in a fixed position, an arm adapted to be pivoted at the center of the wheel and to swing entirely around said wheel, a grooved presser wheel carried by said arm and having teeth on each side of the groove adapted to mesh with the teeth of the wheel in which the strip is to be embedded.

3. The combination in a device for forcing a strip into a toothed grooved wheel, of an arm, a toothed grooved presser wheel carried by the arm, said wheel being made up of two sections secured together, and a ring less in diameter than the wheel clamped between the two parts.

4. The combination in a device for forcing a strip into the annular groove in a toothed wheel, of two arms having longitudinal slots therein, a bearing carried by each arm, a pivot pin extending through the bearings and through the slots in the arms, a lever mounted on the pivot pin, and a grooved presser wheel on the lever having teeth adapted to mesh with the teeth of the first-named grooved wheel.

In testimony whereof, I have signed my name to this specification, in the presence of two subscribing witnesses.

GEORGE L. LEWIS

Witnesses:
 WM. A. BARR,
 JOS. H. KLEIN.